UNITED STATES PATENT OFFICE.

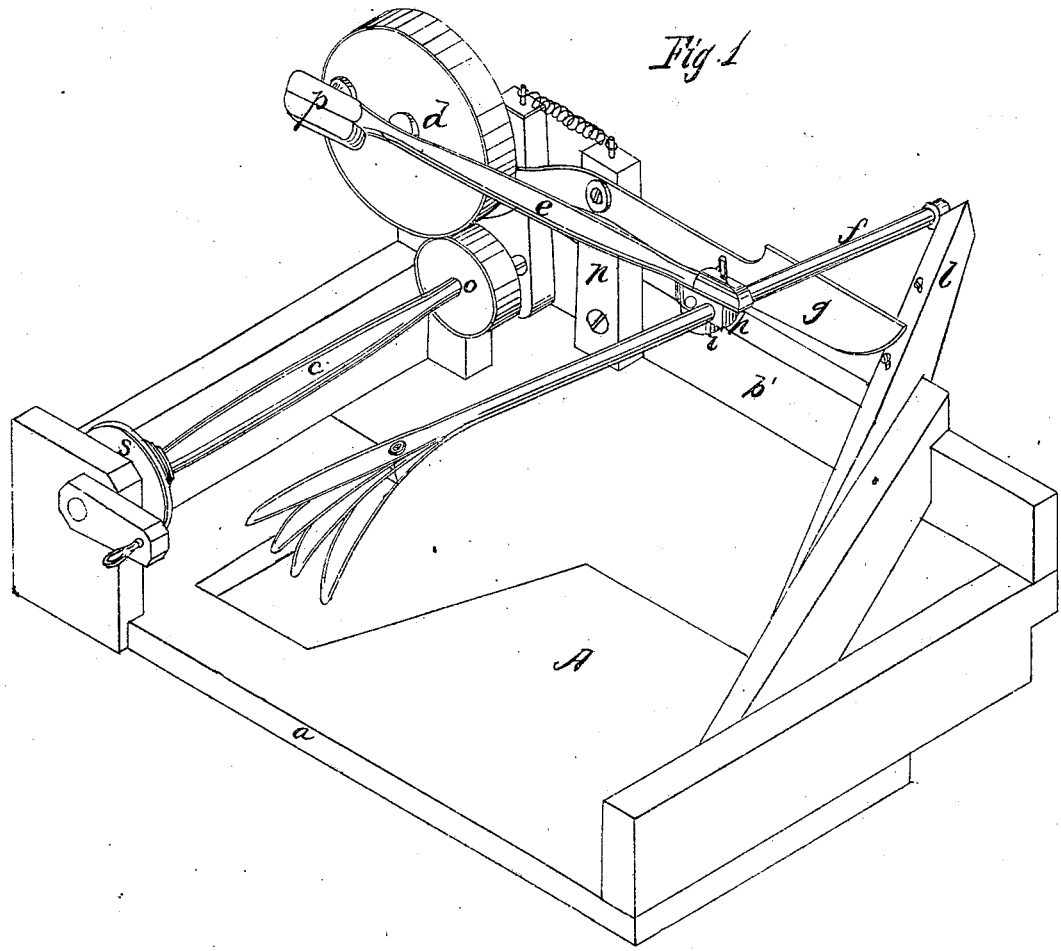

JOHN MUMMA, OF MIDDLETOWN, OHIO.

IMPROVEMENT IN HARVESTER-RAKES.

Specification forming part of Letters Patent No. 53,171, dated March 13, 1866.

*To all whom it may concern:*

Be it known that I, JOHN MUMMA, of Middletown, in Butler county, in the State of Ohio, have invented new and useful Improvements in Automatic Rakes for Harvesting-Machines; and I do hereby delare that the following is a full and exact description thereof, reference being had to the accompanying drawings, and to the letters of reference marked thereon.

Figure 1 is a perspective view of my improvements attached to the frame of a harvesting-machine. Fig. 2 represents an oscillating lever, which causes the fork or rake to rise and fall.

In the drawings, A denotes the platform of the reaping-machine, $a$ being its front edge, to which the cutting apparatus is to be attached, and $b$ is the frame which supports the working mechanism.

The grain side of the machine I denominate the "inner side" of the machine, and the stubble side I call the "outer side."

Across the inner side of the machine there is an inclined guard-board, the rear end of which rests upon the frame-piece $b'$, and to this inclined guard-board the frame-piece $l$ is attached, the latter standing out and projecting behind the machine at an angle of about forty-five degrees, and also forming an acute angle with the line of the inner edge of the machine. At the outer side of the machine and supported in suitable bearings is the shaft $c$, which communicates motion from a main driving-wheel through suitable gearing and pullies to the fork $f$ and lever $g$. The rear end of shaft $c$ is supported in the lower end of a pivoted post or upright, and is provided with the small friction-pulley $o$. At the rear outer corner of the machine, and firmly secured thereto, are two posts, which support in suitable bearings a short shaft, which carries the large friction and crank pulley $d$. On the rear face of pulley $d$ there is a projecting pin, which may be provided with a friction-roll, for actuating the lever $g$, as will be hereinafter more fully described. The post $n$, which is secured to the rear frame-piece $b'$, is provided with a fulcrum-pin near its top for the oscillating lever $g$; and this post $n$ is connected with the pivoted post which supports the rear end of shaft $c$ by a spiral spring, so as to cause the small friction-pulley $o$ to press against the larger one $d$. The pitman $e$ is connected to the crank-wheel $d$ by a ball-and-socket joint at $p$, and to the fork by the fulcrum-block $h$. Connected with the under side of the fulcrum-block $h$ is a friction-roll, $i$, the function of which will be described herein. The rear and upper end of the fork is held loosely in connection with the projecting piece $l$ by means of a swivel or metal loop, but a socket or universal joint may be used for this purpose. A cord and lever may be so connected with the upper end of the pivoted post which supports the rear end of shaft $c$ as that the small friction-roll can be easily thrown out of contact with the large friction-wheel $d$, to cause an intermission in the motion of the fork for any length of time necessary for the accumulation of a gavel upon the platform. This mechanism, not forming a part of my present invention, need not now be more fully described. The cord or lever, however, may be so arranged as to be under the control of the driver. The pulleys $s$ may be used to change the speed of the fork's motion for a similar purpose for which the cord and lever were described.

In the drawings, Fig. 2, the oscillating lever $g$ has that portion which extends behind the friction-wheel $d$ curved, as represented, and upon this curve the pin or friction-roll on the rear face of wheel $d$ works, depressing that end of the lever $g$, and consequently elevating the other end, which the fork rests upon. The curve in the lever may be of any desired degree or extent, according to the elevation of the reel which is usually employed upon reaping-machines. The lever may be thus modified, so as to cause the fork to sweep over the reel in its backward motion.

I will now proceed to describe the operation of my improvement with the mechanism hereinbefore set forth. It will be understood that the motion given to the fork is communicated from the main driving-wheel of a reaping-machine through the shaft $c$ and friction-pulleys $o\ d$. The oscillating lever $g$ is pivoted to the fixed post $n$ by means of a screw provided with a washer, and the rotation of large friction and crank wheel $d$, will cause the pitman $e$ to give the fork its laterally-reciprocating motions, while the pin or friction-roll upon the rear face of the wheel $d$, working upon the curved (concave) side of lever $g$, will cause the rake to be elevated and depressed. The two mechanisms, thus operating conjointly and simultaneously, cause the fork to have a gyratory motion, sweeping the grain from the platform and depositing it near the stubble or outer side of the machine, and then returning in an elevated position to the inner or grain side of the machine for another gavel. The connection of the pitman with the fulcrum-block $h$ must be loose, so as to permit the fork to be sufficiently elevated in its return motion.

Having described my improvement in rakes for harvesters, what I claim therein, and desire to secure by Letters Patent, is—

1. The combination of the crank friction-wheel $d$ and lever $g$ with the fork $f$, and its fixed fulcrum-block $h$, arranged and operating substantially as described, for the purpose set forth.

2. The construction of the lever $g$, in the manner described, when operated by the pin or friction-roll on the rear face of the wheel $d$, for elevating the fork during its return motion, substantially as and for the purpose specified.

In testimony whereof I have hereunto set my hand this 28th day of September, 1865.

JOHN MUMMA.

Witnesses:
H. P. K. PECK,
L. D. DOTY.